United States Patent
Abdellatif et al.

(10) Patent No.: US 12,084,182 B2
(45) Date of Patent: Sep. 10, 2024

(54) UAV FOR CONTINUOUS ULTRASOUND TESTING (UT) SCANS WITH A FLEXIBLE PAYLOAD

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Jeff S. Shamma, Champaign, IL (US); Sultan Shaqaq, Dhahran (SA); Abdullah Arab, Dhahran (SA); Abdullah A. Alkhder, Dhahran (SA); Sahejad Patel, Thuwal (SA)

(73) Assignees: Saudi Arabian Oil Company, Dhahran (SA); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 525 days.

(21) Appl. No.: 17/444,515

(22) Filed: Aug. 5, 2021

(65) Prior Publication Data
US 2023/0045635 A1  Feb. 9, 2023

(51) Int. Cl.
*B64C 39/02* (2023.01)
*G01N 29/24* (2006.01)
*B64U 101/00* (2023.01)

(52) U.S. Cl.
CPC ....... *B64C 39/024* (2013.01); *G01N 29/2475* (2013.01); *B64U 2101/00* (2023.01)

(58) Field of Classification Search
CPC .. B64C 39/024; G01N 29/2475; G01N 29/28; G01N 2291/106; G01N 29/04; G01N 29/225; G01N 29/265; B64U 2101/00
See application file for complete search history.

(56) References Cited

U.S. PATENT DOCUMENTS

| | | | |
|---|---|---|---|
| 7,273,195 B1 | 9/2007 | Golliher | |
| 10,946,958 B2 | 3/2021 | Baek et al. | |
| 2016/0282309 A1 | 9/2016 | Kleinert et al. | |
| 2018/0003161 A1 | 1/2018 | Michini et al. | |
| 2019/0166765 A1* | 6/2019 | Maor | A01D 46/30 |
| 2020/0189712 A1 | 6/2020 | Briod et al. | |

(Continued)

FOREIGN PATENT DOCUMENTS

| | | |
|---|---|---|
| CN | 206378463 U | 8/2017 |
| CN | 108408082 A | 8/2018 |
| FR | 3077057 A1 | 7/2019 |

(Continued)

OTHER PUBLICATIONS

"Hybrid Flying Rolling With Snake-Arm Robot For Contact Inspection" by Sanchez-Cuevas et al. (Year: 2019).*

(Continued)

*Primary Examiner* — Rodney A Butler
(74) *Attorney, Agent, or Firm* — Leason Ellis LLP (57) ABSTRACT

An unmanned aerial vehicle (UAV) includes a flexible holder retaining a plurality of probes. The flexible holder is deformable to arrange the probes around a portion of a structure, allowing the probes to scan the portion of the structure. At least one of the plurality of probes is an ultrasonic test (UT) probe to scan the portion of the structure with ultrasonic waves.

20 Claims, 5 Drawing Sheets

(56) References Cited

U.S. PATENT DOCUMENTS

2021/0061463 A1    3/2021   Briod et al.

FOREIGN PATENT DOCUMENTS

| | | |
|---|---|---|
| GB | 2569219 A | 6/2019 |
| WO | 2017183637 A1 | 10/2017 |
| WO | 2020169686 A1 | 8/2020 |

OTHER PUBLICATIONS

Rami Mattar; Development of a Wall Sticking Drone for Non-Destructive Ultrasonic and Corrosio Testing; Apr. 1, 2018.
Dayi Zhang; Unmanned Aerial Vehicle for Autonomous Non-Destructive Testing Inspections; Apr. 9, 2019.
MatBotix; Ultrasonic Sensor Operation on a UAV; Apr. 9, 2021.
Dayi Zhang, et al; Autonomous Ultrasonic Inspection Using Unmanned Aerial Vehicle; Apr. 9, 2021.
Office Action in corresponding Saudi Arabian Appliation No. 122440012 mailed Jan. 29, 2024; 10 pages.
Garcia Rubiales, F. Javier, et al.; Soft-tentacle gripper for pipe crawling to inspect industrial facilities using uavs; Sensors 21.12 (2021): 4142.

* cited by examiner

UAV FOR CONTINUOUS ULTRASOUND TESTING (UT) SCANS WITH A FLEXIBLE PAYLOAD

FIELD OF THE DISCLOSURE

The present disclosure relates generally to an unmanned aerial vehicle (UAV), and, more particularly, to a UAV having a flexible payload retaining probes.

BACKGROUND OF THE DISCLOSURE

In the oil and gas industry, UAVs are used to inspect or evaluate industrial structures, such as pipes, vessels, stacks, and other structures. UAVs can fly toward a structure, perch on the structure, and perform spot checks of the structure. For example, using ultrasonic probes, UAVs can perform ultrasonic tests (UT) of structures.

Such UAVs employ batteries as portable power sources. The power capacity of such batteries limits the use of UAVs to spot checks. To perform more extensive scans such as continuous scans over a greater portion of the structure, UAVs must move quickly adjacent to the structure, which limits the resolution of the scan. Otherwise, the limited battery power becomes depleted.

SUMMARY OF THE DISCLOSURE

According to an embodiment consistent with the present disclosure, a UAV includes a flexible holder retaining a plurality of probes. The flexible holder is deformable to arrange the probes around a portion of a structure, allowing the probes to scan the portion of the structure. At least one of the plurality of probes is an ultrasonic test (UT) probe to scan the portion of the structure with ultrasonic waves. Accordingly, continuous three-dimensional (3D) can be performed efficiently and over a greater portion of the structure before limited battery power becomes depleted.

In an embodiment, a UAV for probing a portion of a structure, comprises a chassis, a plurality of propellers, a plurality of probes, a processor, and a flexible holder. The plurality of propellers are mounted to the chassis. The plurality of probes collect data. The processor is configured by code executing therein. The flexible holder is mounted to the chassis and adapted to retain the plurality of probes. The flexible holder is configurable by the processor to be in a first configuration in which the flexible holder is pressed against the portion of the structure. The flexible holder is also configurable by the processor to deform into a second configuration in which the plurality of probes is arranged around the portion of the structure. The plurality of probes scan the portion of the structure.

The processor is configured by the code to enable a first flight mode in which the propellers move the UAV while the flexible holder is in the first configuration. The processor also enables a second flight mode in which the propellers move the UAV solely along a length of the portion of the structure while the flexible holder is in the second configuration, wherein the probes collect data when the UAV is in the second flight mode. The flexible holder is disposed on a top portion of the chassis. Alternatively, the flexible holder is disposed on a bottom portion of the chassis. In another embodiment, the flexible holder is disposed on a side portion of the chassis. At least one of the plurality of probes is an ultrasonic test (UT) probe. The at least one of the plurality of probes is a dry coupled UT probe.

In another embodiment, a payload of a UAV of the type arranged to probe a portion of a structure, comprises a plurality of probes, a processor, and a flexible holder. The plurality of probes collect data. The processor is configured by code executing therein. The flexible holder mounted to a chassis of the UAV and adapted to retain the plurality of probes. The flexible holder is configurable by the processor to be in a first configuration in which the flexible holder is pressed against the portion of the structure. The flexible holder is also configurable by the processor to deform into a second configuration in which the plurality of probes is arranged around the portion of the structure. The plurality of probes scan the portion of the structure.

The processor is configured by the code to enable a first flight mode in which the propellers move the UAV while the flexible holder is in the first configuration. The processor also enables a second flight mode in which the propellers move the UAV solely along a length of the portion of the structure while the flexible holder is in the second configuration, wherein the probes collect data when the UAV is in the second flight mode. The flexible holder is disposed on a top portion of the chassis. Alternatively, the flexible holder is disposed on a bottom portion of the chassis. In another embodiment, the flexible holder is disposed on a side portion of the chassis. The at least one of the plurality of probes is an ultrasonic test (UT) probe. The at least one of the plurality of probes is a dry coupled UT probe.

In a further embodiment, a method for probing a portion of a structure using an UAV, comprises providing a payload with a flexible holder mounted to a chassis of the UAV, providing a plurality of probes on the flexible holder, advancing the UAV to a first location along the structure, pressing the flexible holder against the portion of the structure at the first location, deforming the flexible holder to arrange the plurality of probes around the structure, scanning the structure at the first location using the plurality of probes, navigating the UAV to at least a second location along the structure, and repeating the scanning step at at least the second location.

The navigating step is performed while the flexible holder remains in the deformed configuration. The method further comprises disposing the payload on a top portion of the chassis. Alternatively, the method further comprises disposing the payload on a bottom portion of the chassis. In another embodiment, the method comprises disposing the payload on a side portion of the chassis. The scanning further comprises scanning the portion of the structure using an ultrasonic test (UT) probe as at least one of the plurality of probes.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a UAV includes a flexible holder retaining a plurality of probes. The flexible holder is deformable to arrange the probes around a portion of a structure, allowing the probes to scan the portion of the structure. At least one of the plurality of probes is an ultrasonic test (UT) probe to scan the portion of the structure with ultrasonic waves.

Figure 1:
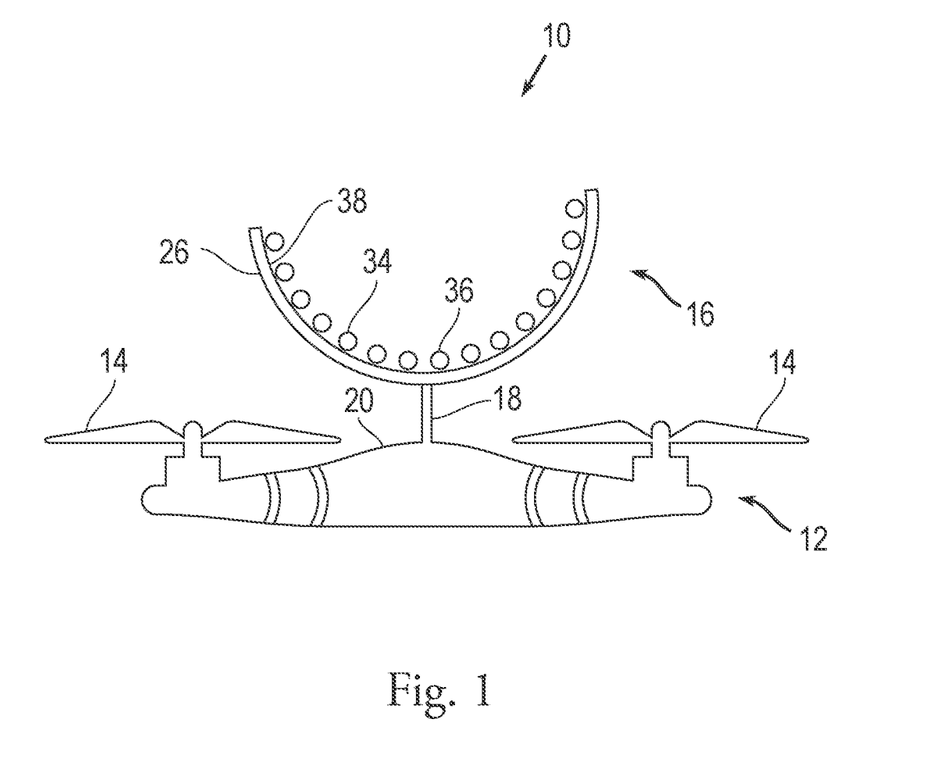
FIG. 1 is a front view a UAV having a flexible payload oriented according to an embodiment.
Figure 2:
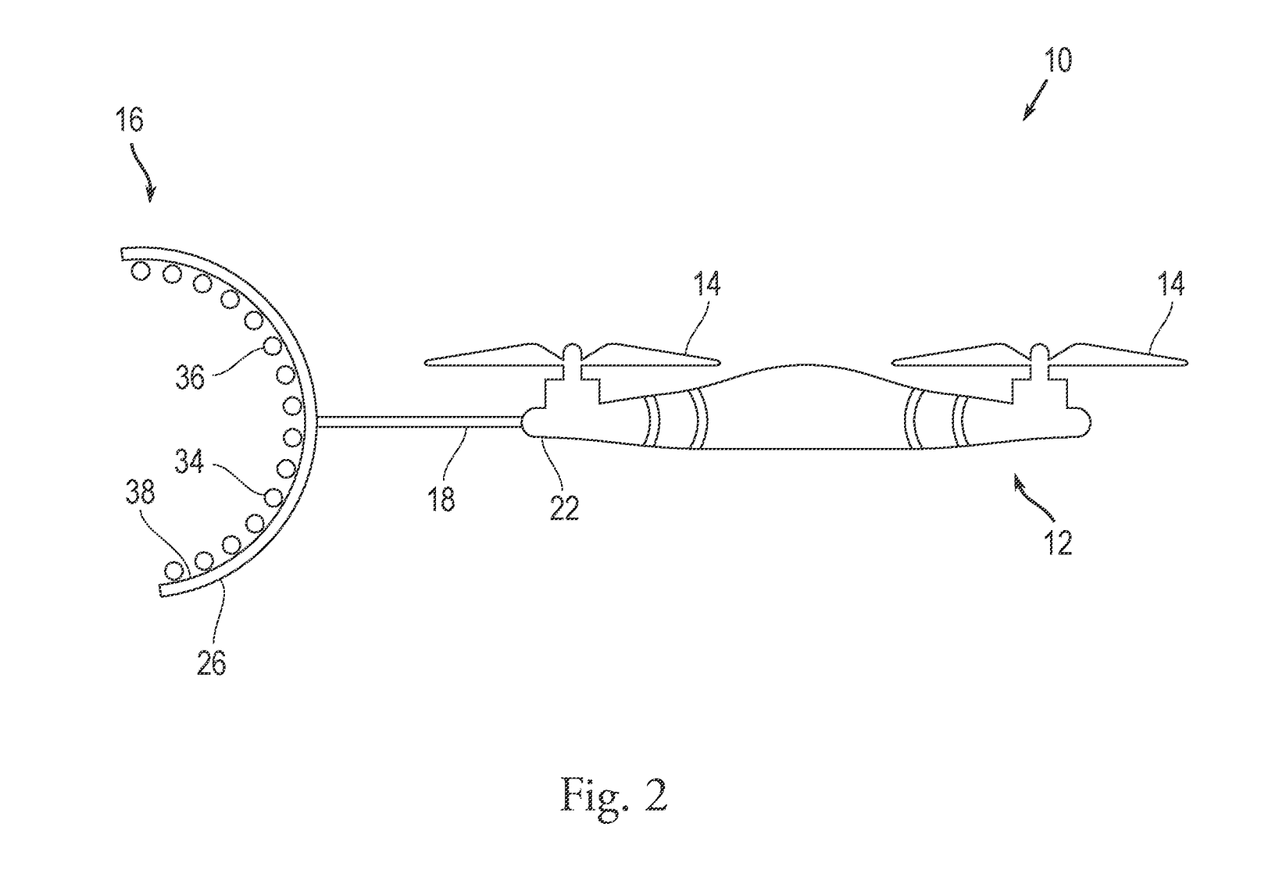
FIG. 2 is a front view a UAV having a flexible payload oriented according to another embodiment.
Figure 3:
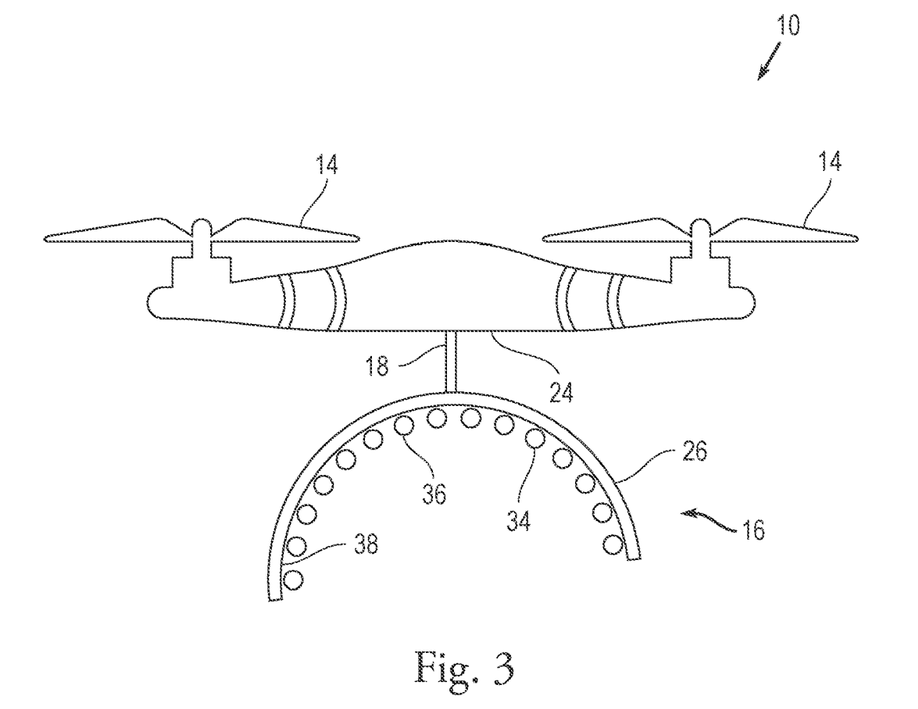
FIG. 3 is a front view a UAV having a flexible payload oriented according to a further embodiment.

As shown in FIGS. 1-3, the UAV 10 includes a chassis 12 having at least one propeller 14 and a flexible payload 16. The payload 16 is mounted to the chassis 12 by a rigid mounting member 18. In a first embodiment, shown in FIG. 1, the payload 16 is mounted to the top portion 20 of the chassis 12. In a second embodiment, shown in FIG. 2, the payload 16 is mounted to a side portion 22 of the chassis 12. In a third embodiment, shown in FIG. 3, the payload 16 is mounted to a bottom portion 24 of the chassis 12.

Figure 4:
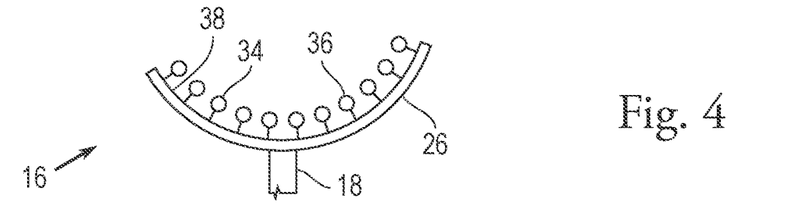
FIG. 4 is a front view of a flexible payload in an initial non-deformed state.
Figure 5:
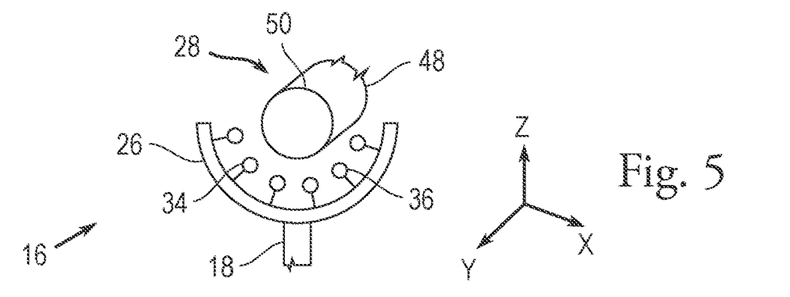
FIG. 5 is a front view of a flexible payload deformed around a first structure.
Figure 6:
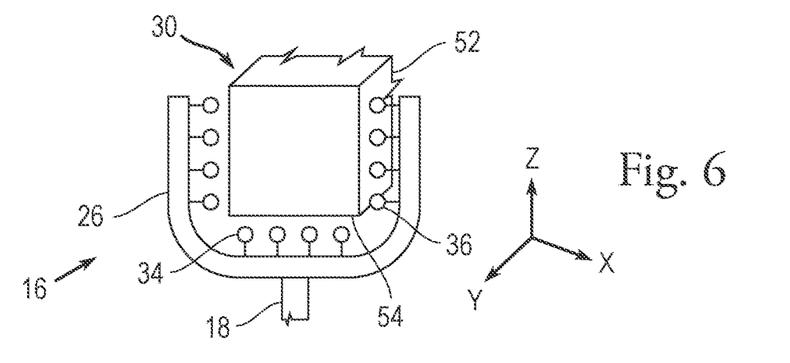
FIG. 6 is a front view of a flexible payload deformed around a second structure.

In each of the embodiments of FIGS. 1-3, the payload 16 includes a flexible holder 26 coupled to the rigid mounting member 18. The flexible holder 26 can be composed of rubber. Alternatively, the flexible holder 26 can be composed of plastic. In a further embodiment, the flexible holder 26 can be composed of a shape-memory material. The shape-memory material can be a shape-memory polymer. Alternatively, the shape-memory material can be a shape-memory alloy. The shape-memory alloy can include a copper-aluminum-nickel alloy. The shape-memory alloy can also include nickel-titanium. In each embodiment of the flexible holder 26, the flexible holder 26 has an initial shape in a first configuration, as shown in FIG. 4. The flexible holder 26 can then be deformed to be in a second configuration to conform to a shape of a structure 28, 30, as shown in FIGS. 5-6, respectively. The deformation of the shape of the flexible holder 26 is described in greater detail below.

Figure 7:
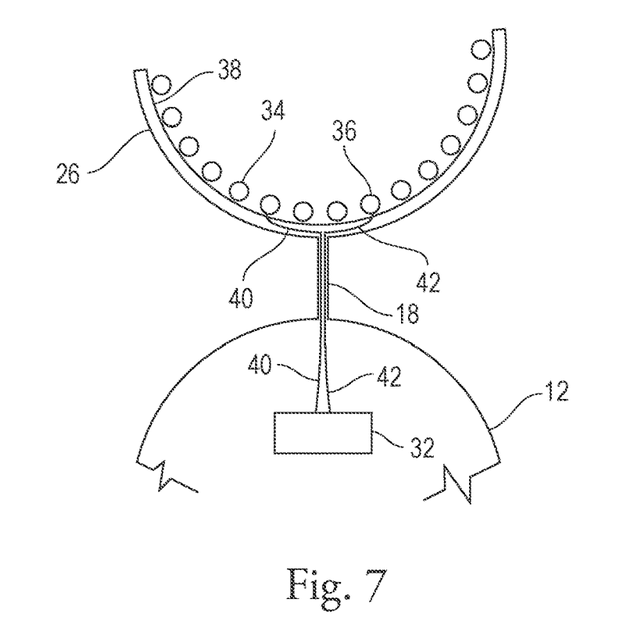
FIG. 7 is a cross-sectional view of a portion of a chassis of the UAV of FIGS. 1-3.

After the flexible holder 26 is removed from a structure 28, 30, the flexible holder 26 can return to the initial shape in the first configuration as shown in FIG. 4. As shown in FIG. 7, a processor 32 is included in the chassis 12. As described in greater detail below, the processor 32 can control the flexible holder 26 to deform. The processor 32 can also control the deformed flexible holder 26 to return to the initial shape. For example, when the flexible holder 26 is composed of a shape-memory alloy, the processor 32 can emit signals to portions of the flexible holder 26 to cause the flexible holder 26 to return to the initial shape. In an example embodiment, the emitted signals from the processor 32 can generate temperature changes in portions of the flexible holder 26 composed of shape-memory alloy. The temperature changes then cause the shape-memory alloy to return to the initial shape of the flexible holder 32.

Referring to any of FIGS. 1-9, the payload 16 further includes a plurality of probes 34, 36 mounted to a side 38 of the flexible holder 26. At least one probe 34, 36 can be a passive probe configured to receive radiation or sound from a structure. For example, at least one probe 34, 36 can be an ultrasonic probe configured to at least receive ultrasonic test (UT) signals from a structure. Alternatively, at least one probe 34, 36 can be an active probe configured to transmit radiation or sound toward a structure, and to receive reflected radiation or sound from the structure. In a further embodiment, at least one probe 34, 36 is a dry coupled UT probe configured to move along a surface of a structure to scan the structure. Accordingly, the probes 34, 36 can collect data corresponding to scans of the structures 28, 30.

Referring to the cross-sectional view of a portion of the chassis 12 in FIG. 7, the processor 32 is positioned in the chassis 12. The processor 32 is configured by code executing therein to control the UAV 10. For example, the processor 32 selectively controls the propellers 14 to fly the UAV 10 toward a structure 28, 30 to be scanned in a first flight mode. The processor 32 can then control the UAV 10 to perch the UAV 10 on the structure 28, 30. In addition, a plurality of wires 40, 42 extend from the processor 32, through the rigid mounting member 18, and through the flexible holder 26 to respective probes 34, 36. Via the wires 40, 42, the processor 32 can at least receive signals from the probes 34, 36 to scan the structure 28, 30 to which the probes 34, 36 are adjacently positioned. The received signals can correspond to radiation or sound received by the probes 34, 36 to scan the structure 28, 30. In addition, via the wires 40, 42, the processor 32 can at least transmit signals to the probes 34, 36 to cause the probes 34, 36 to emit radiation or sound to scan the structure 28, 30. For example, as described above, the probes 34, 36 can be ultrasonic probes configured to UT scan the structure 28, 30.

In addition, the processor 32 can also be connected by at least one wire to control the shape of the flexible holder 26, as described above. For example, the processor 32 can generate signals transmitted to respective portions of the flexible holder 26 to generate temperature changes in the portions of the flexible holder 26 composed of shape-memory alloy. The temperature changes then cause the shape-memory alloy to return to the initial shape of the flexible holder 32, as shown in FIG. 4.

Referring FIGS. 5-6, when the UAV 10 flies toward a structure 28, 30 in the z-direction, the flexible holder 26 is pressed against the surfaces of the structure 28, 30. The flexible holder 26 then deforms in the x-z plane to conform to the cross-sectional shape of the structure 28, 30. For example, as shown in FIG. 5, the structure 28 has a generally circular cross-section with multiple curved surfaces. As shown in FIG. 6, the structure 30 has a generally rectangular cross-section with multiple planar surfaces. With the flexible holder 26 in the deformed state, the probes 34, 36 are oriented and positioned adjacent to the outer surfaces of the structure 28, 30, as shown in FIGS. 5-6, respectively.

Figure 8:
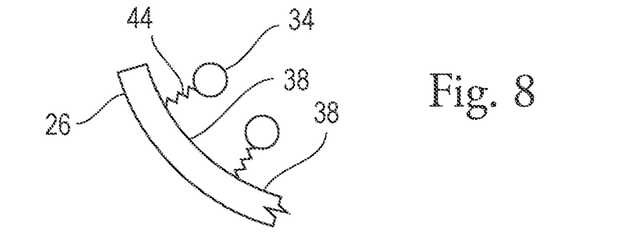
FIG. 8 is a front view of probes on a flexible payload according to an embodiment.
Figure 9:
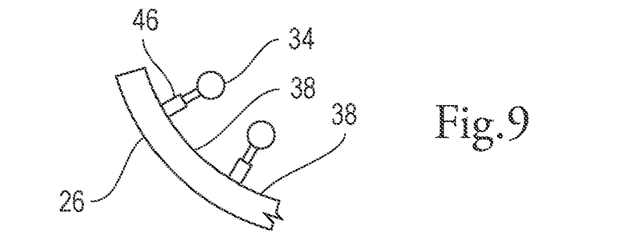
FIG. 9 is a front view of probes on a flexible payload according to an alternative embodiment.

To orient and position the probes 34, 36 at different locations relative to outer surfaces of the structure 28, 30, the probes 34, 36 are flexibly mounted to the side 38 of the flexible holder 26. For example, as shown in FIG. 8, at least one probe 34, 36 is connected to the side 38 by a resilient member 44. The resilient member 44 can be a spring. In another example, as shown in FIG. 9, at least one probe 34, 36 is connected to the side 38 by an adjustable member 46. The adjustable member 46 can be a telescoping member.

With the probes 34, 36 disposed at different locations adjacent to the outer surfaces of the structure 28, 30, the probes 34, 36 can perform multiple continuous UT scans of the structure 28, 30 simultaneously. Accordingly, the payload 16 can efficiently scan the structure 28, 30 having different cross-sectional shapes.

Furthermore, with the payload 16 deformed in the x-z plane, the UAV 10 can fly in the y-direction. With the UAV 10 flying in the y-direction, the payload 16 can move along the surfaces 48, 50, 52, 54 of the structures 28, 30, respectively, in the y-direction. Such movement in the y-direction allows the probes 34, 36 to perform multiple continuous UT scans of the structure 28, 30 in three dimensions (3D) simultaneously. Accordingly, the payload 16 can efficiently scan the structure 28, 30 having different cross-sectional shapes and in three dimensions.

Figure 10:
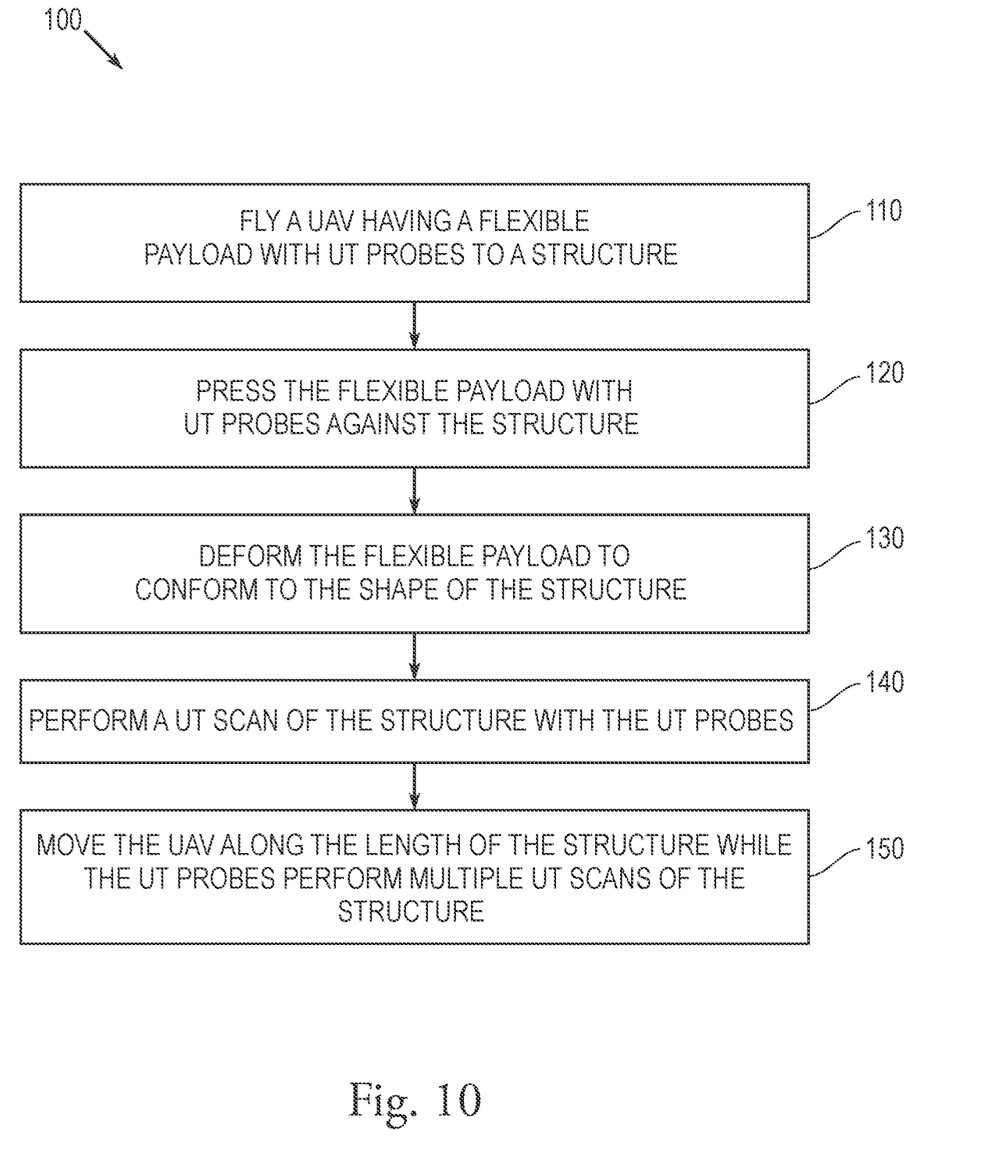
FIG. 10 is a flowchart of operation of the UAV having the flexible payload.

In operation, according to the method 100 in FIG. 10, the UAV 10 with the flexible payload 16 and the probes 34, 36 flies to a structure in step 110. As described above, the probes 34, 36 can be UT probes. Depending on the orientation of the payload 16 on the chassis 12 according to FIGS. 1-3, the UAV 10 in a first flight mode flies to the structure in the x-direction and the z-direction, such as the structures 28, 30 in FIGS. 5-6, respectively. The UAV 10 then presses the flexible payload 16 with the probes 34, 36 against the structure 28, 30 in step 120. The flexible payload 16 then deforms in the x-z plane in step 130 to conform to the shape of the structure 28, 30. The UAV 10 then performs a UT scan of the structure 28, 30 with the UT probes 34, 36 in step 140. In addition, the UAV 10 can move along the length of the structure 28, 30. Accordingly, the UAV 10 can move in a second flight mode in the y-direction in step 150 while the UT probes 34, 36 continue to perform multiple UT scans of the structure 28, 30. Accordingly, the UAV 10 with the probes 34, 36 can perform continuous 3D scans of the structures 28, 30 with greater efficiency and over a greater portion of the structures 28, 30 before limited battery power of the UAV 10 becomes depleted.

Portions of the methods described herein can be performed by software or firmware in machine readable form on a tangible (e.g., non-transitory) storage medium. For example, the software or firmware can be in the form of a computer program including computer program code adapted to cause the processor to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) for probing a portion of a structure, comprising:
    a chassis;
    a plurality of propellers mounted to the chassis;
    a plurality of probes that collect data;
    a processor configured by code executing therein to generate a first signal and a second signal; and
    a flexible holder mounted to the chassis and adapted to receive the first and second signals from the processor and to retain the plurality of probes,
    wherein the flexible holder, responsive to the first signal, is configurable by the processor to be set in a first configuration in which the flexible holder is pressed against the portion of the structure,
    wherein the flexible holder in the first configuration, responsive to the second signal, is configurable by the processor to deform from the first configuration into a second configuration in which the plurality of probes is arranged around the portion of the structure,
    wherein the plurality of probes scan the portion of the structure, and
    wherein the flexible holder in the second configuration, responsive to the first signal, is configurable by the processor to deform back from the second configuration into the first configuration.

2. The UAV of claim 1, wherein the processor is configured by the code to enable a first flight mode in which the propellers move the UAV while the flexible holder is in the first configuration and a second flight mode in which the propellers move the UAV solely along a length of the portion of the structure while the flexible holder is in the second configuration, wherein the probes collect data when the UAV is in the second flight mode.

3. The UAV of claim 1, wherein the flexible holder is disposed on a top portion of the chassis.

4. The UAV of claim 1, wherein the flexible holder is disposed on a bottom portion of the chassis.

5. The UAV of claim 1, wherein the flexible holder is disposed on a side portion of the chassis.

6. The UAV of claim 1, wherein at least one of the plurality of probes is an ultrasonic test (UT) probe.

7. The UAV of claim 6, wherein the at least one of the plurality of probes is a dry coupled UT probe.

8. A payload of an unmanned aerial vehicle (UAV) of the type arranged to probe a portion of a structure, comprising:
   a plurality of probes that collect data;
   a processor configured by code executing therein to generate a first signal and a second signal; and
   a flexible holder mounted to a chassis of the UAV and adapted to receive the first and second signals from the processor and to retain the plurality of probes,
   wherein the flexible holder, responsive to the first signal, is configurable by the processor to be set in a first configuration in which the flexible holder is pressed against the portion of the structure,
   wherein the flexible holder in the first configuration, responsive to the second signal, is configurable by the processor to deform from the first configuration into a second configuration in which the plurality of probes is arranged around the portion of the structure,
   wherein the plurality of probes scan the portion of the structure, and
   wherein the flexible holder in the second configuration, responsive to the first signal, is configurable by the processor to deform back from the second configuration into the first configuration.

9. The payload of claim 8, wherein the processor is configured by the code to enable a first flight mode in which the propellers move the UAV while the flexible holder is in the first configuration and a second flight mode in which the propellers move the UAV solely along a length of the portion of the structure while the flexible holder is in the second configuration, wherein the probes collect data when the UAV is in the second flight mode.

10. The payload of claim 8, wherein the flexible holder is disposed on a top portion of the chassis.

11. The payload of claim 8, wherein the flexible holder is disposed on a bottom portion of the chassis.

12. The payload of claim 8, wherein the flexible holder is disposed on a side portion of the chassis.

13. The payload of claim 8, wherein at least one of the plurality of probes is an ultrasonic test (UT) probe.

14. The payload of claim 13, wherein the at least one of the plurality of probes is a dry coupled UT probe.

15. A method for probing a portion of a structure using an unmanned aerial vehicle (UAV), comprising:
   providing a processor configured by code executing therein to generate a first signal and a second signal;
   providing a payload with a flexible holder mounted to a chassis of the UAV;
   providing a plurality of probes on the flexible holder;
   advancing the UAV to a first location along the structure;
   receiving the first signal at the flexible holder;
   responsive to the first signal, setting the flexible holder to be in a first configuration;
   pressing the flexible holder in the first configuration against the portion of the structure at the first location;
   receiving the second signal at the flexible holder in the first configuration;
   responsive to the second signal, deforming the flexible holder from the first configuration to a second configuration to arrange the plurality of probes around the structure;
   scanning the structure at the first location using the plurality of probes;
   navigating the UAV to at least a second location along the structure;
   repeating the scanning step at at least the second location;
   receiving the first signal at the flexible holder in the second configuration; and
   responsive to the first signal, deforming the flexible holder back from the second configuration to the first configuration.

16. The method of claim 15, wherein the navigating step is performed while the flexible holder remains in the deformed second configuration.

17. The method of claim 15, further comprising:
   disposing the payload on a top portion of the chassis.

18. The method of claim 15, further comprising:
   disposing the payload on a bottom portion of the chassis.

19. The method of claim 15, further comprising:
   disposing the payload on a side portion of the chassis.

20. The method of claim 15, wherein the scanning further comprises:
   scanning the portion of the structure using an ultrasonic test (UT) probe as at least one of the plurality of probes.

* * * * *